Aug. 28, 1962   A. A. CADWALLADER   3,051,886
MARINE POWER CONTROL SYSTEM
Filed Jan. 7, 1959   7 Sheets-Sheet 5

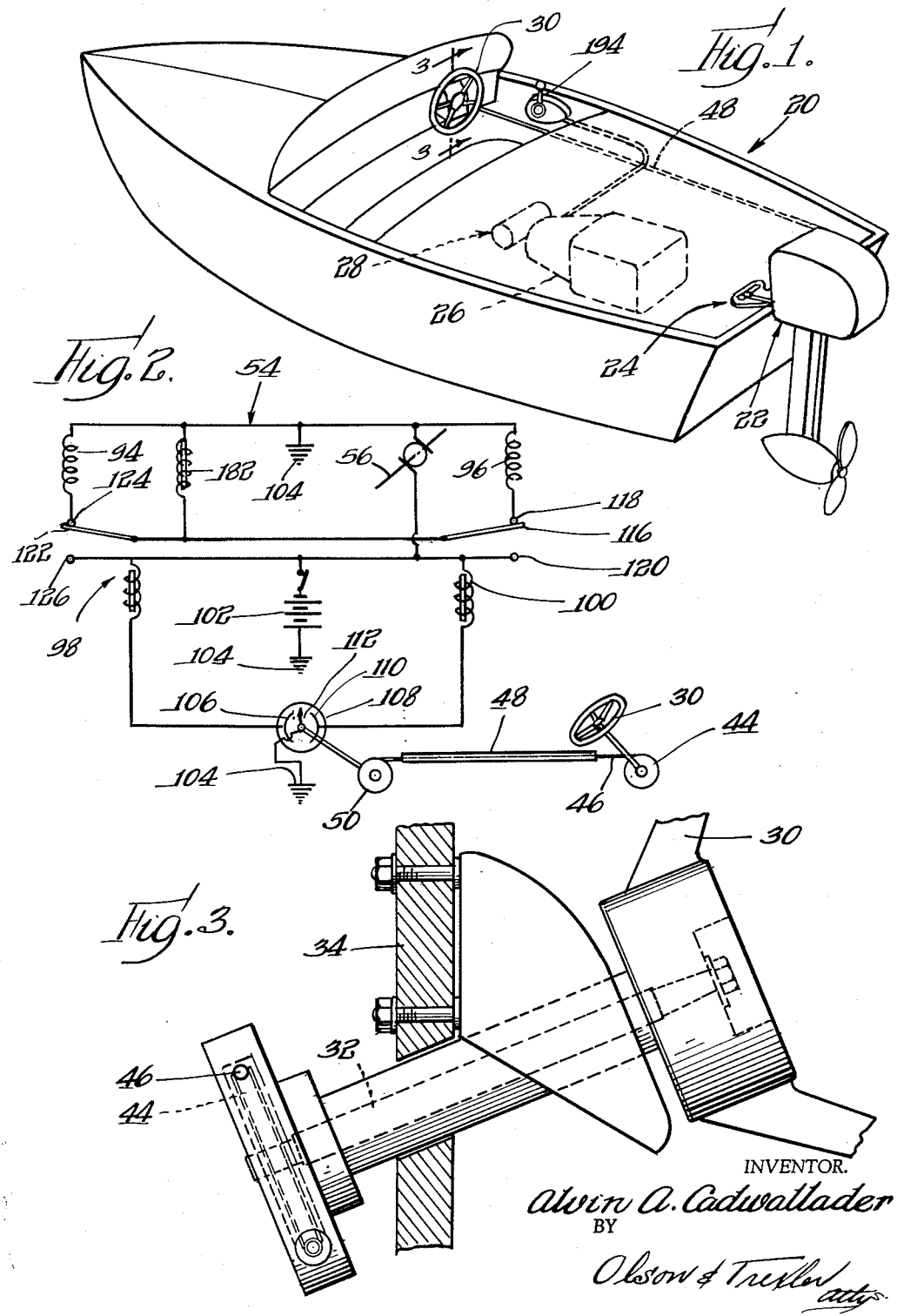

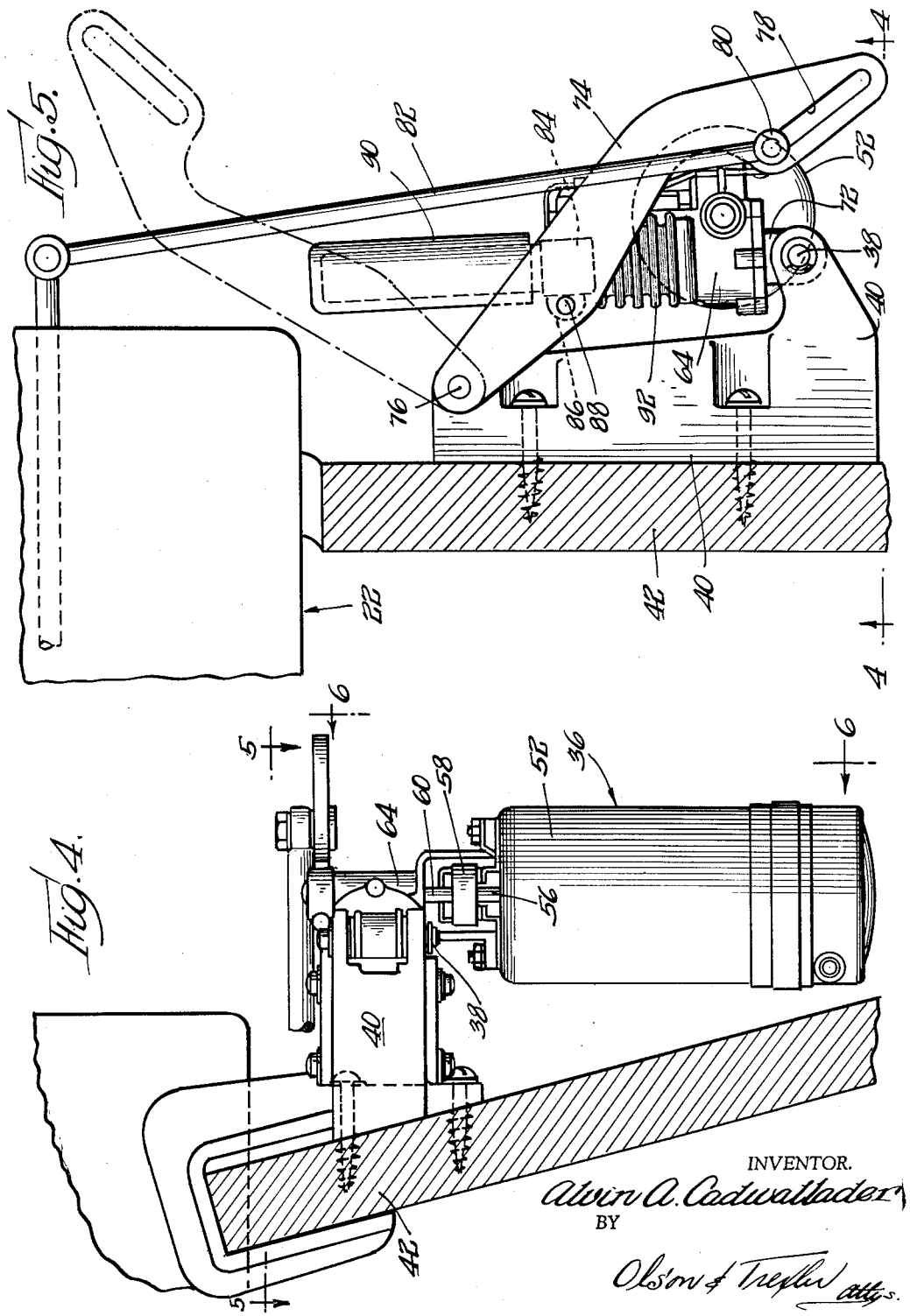

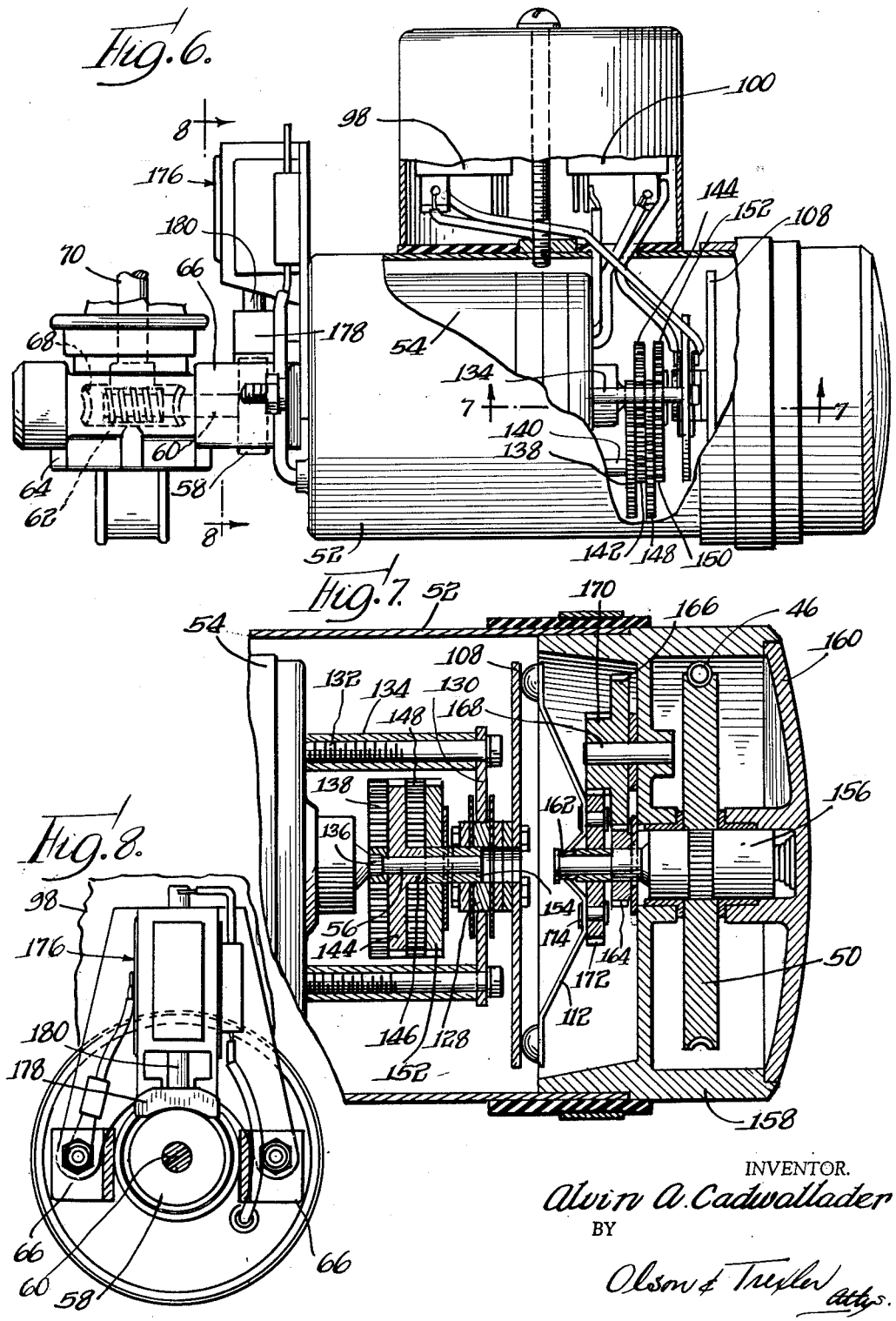

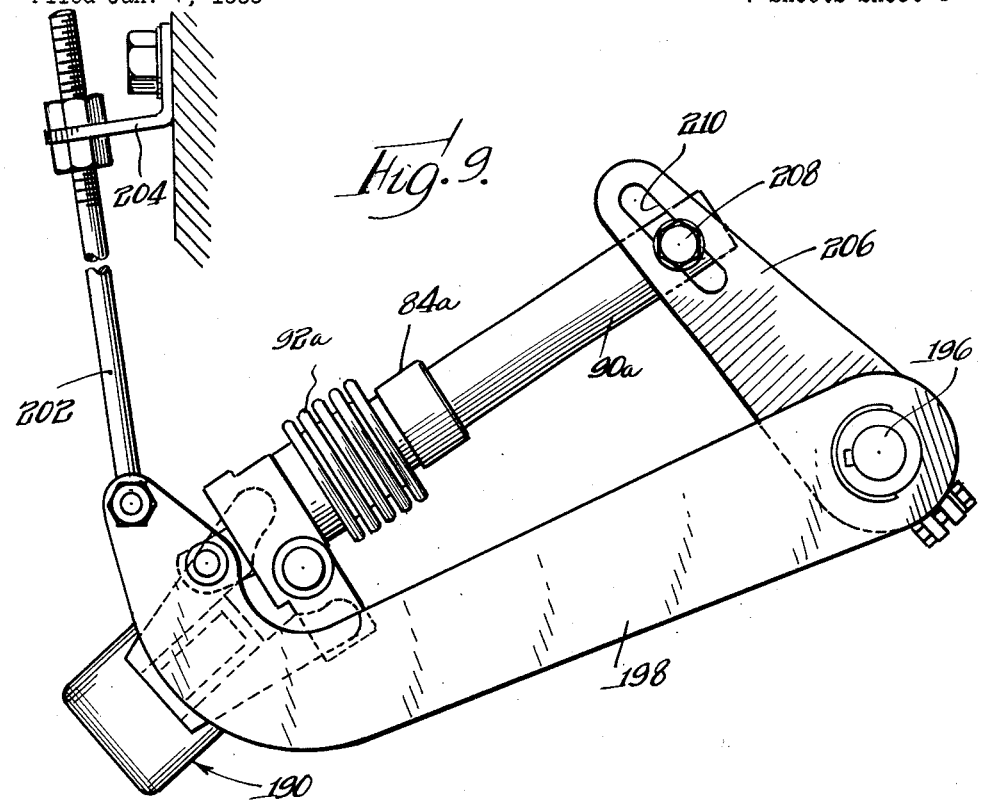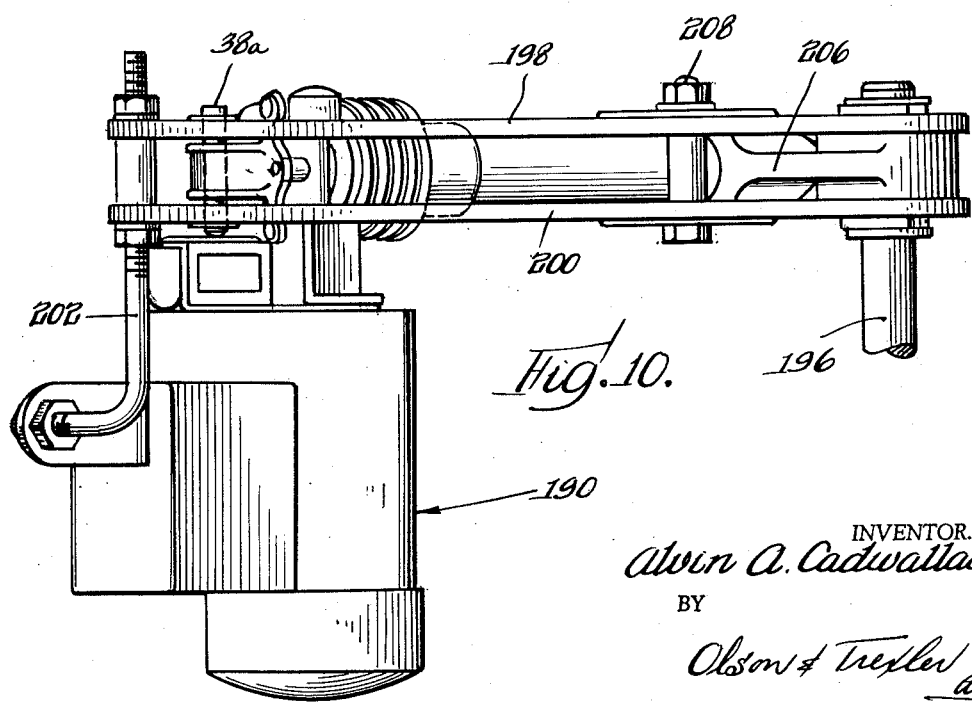

INVENTOR.
Alvin A. Cadwallader
BY
Olson & Trexler
Attys.

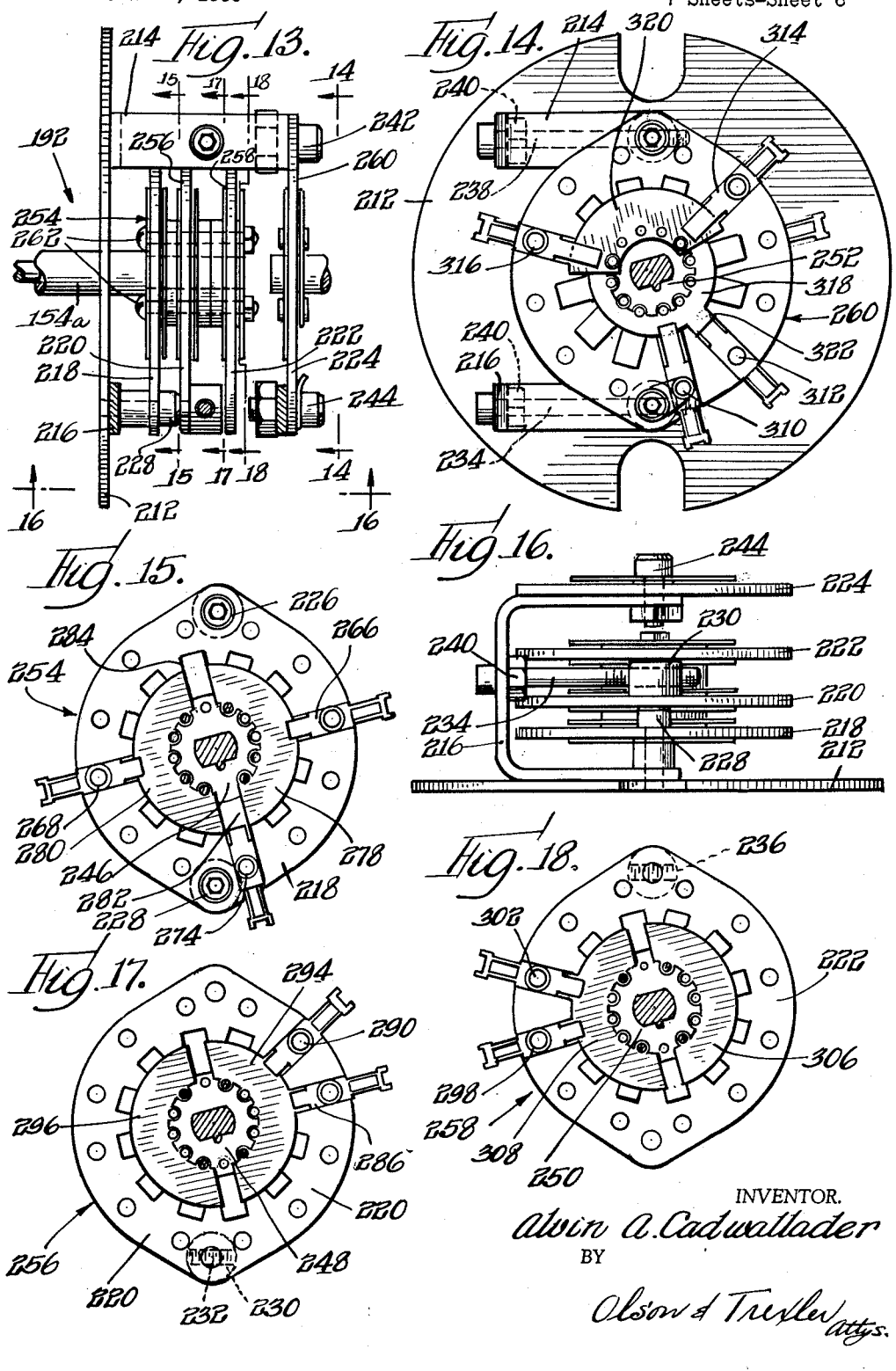

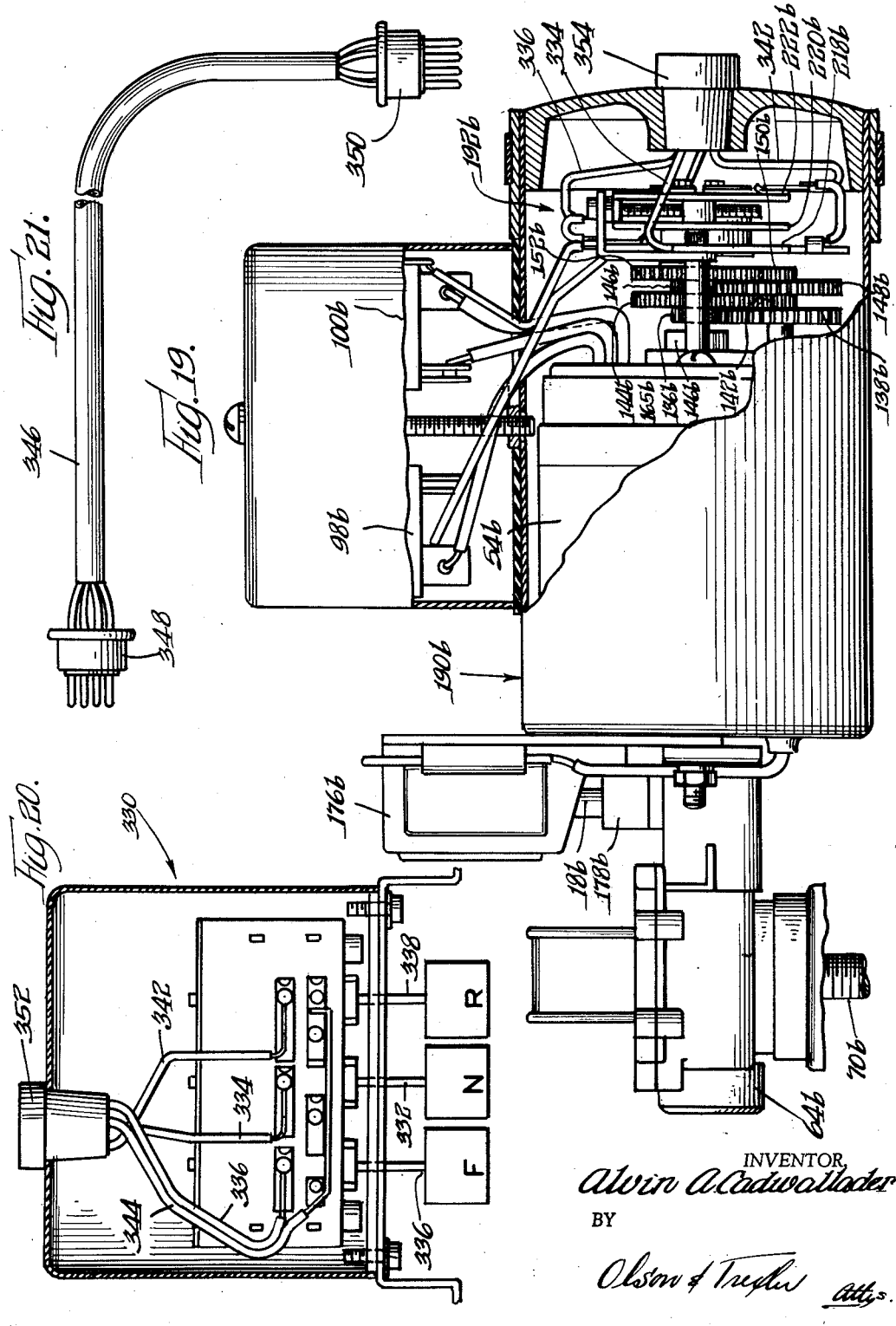

United States Patent Office 3,051,886
Patented Aug. 28, 1962

3,051,886
MARINE POWER CONTROL SYSTEM
Alvin A. Cadwallader, Hatboro, Pa., assignor to Teleflex Incorporated, North Wales, Pa., a corporation of Delaware
Filed Jan. 7, 1959, Ser. No. 785,343
5 Claims. (Cl. 318—467)

The present invention relates to power actuated controls, and more specifically to power operated controls especially suitable for use in motor boats and the like.

As will be understood, situations frequently occur when an operator of a boat must exert considerable force to the steering wheel of a boat in order to maneuver the boat in a desired manner. Furthermore it is usually necessary for the operator to maintain constantly a force on the steering wheel so as to hold the boat on the desired course and this becomes tiring, especially during a cruise of considerable length. It will also be appreciated that many occasions arise when it is desired to shift the gears of the marine engine to and from neutral, forward and reverse positions and that frequently a considerable force must be applied in order to accomplish such shifting, particularly when larger engines are involved.

It is an important object of the present invention to relieve the difficulties mentioned above, and more particularly to provide novel power actuated control means whereby motor boats and the like may be controlled or steered with a minimum of effort and also the shifting of the gears may be accomplished easily.

A more specific object of the present invention is to provide a novel power actuated steering system for motor boats and the like which is constructed so as effectively to lock the rudder of the boat in a given position until the steering wheel is manually turned so as to relieve an operator of the necessity of maintaining pressure constantly on the steering wheel.

Still another object of the present invention is to provide novel power operated control means for shifting gears of a marine engine or the like, which control means may be energized in response to operation of push-button or lever controled elements.

A further object of the present invention is to provide novel power actuated control means of the above described type which may be readily installed in various motor boats and the like either as new or replacement equipment.

Still another object of the present invention is to provide novel power actuated control means of the above described type which are of relatively simple, economical and efficient construction.

Other objects and advantages of the present invention will become apparent from the following description and the accompanying drawings wherein:

FIG. 1 is a perspective view showing a motor boat having control means incorporating features of the present invention installed therein;

FIG. 2 is a schematic view showing steering control means incorporating features of the present invention;

FIG. 3 is an enlarged fragmentary sectional view taken along line 3—3 in FIG. 1;

FIG. 4 is a fragmentary sectional view taken generally along line 4—4 in FIG. 5;

FIG. 5 is a fragmentary sectional view taken generally along line 5—5 in FIG. 4;

FIG. 6 is a fragmentary elevational view of a power actuator unit incorporating features of the present invention as seen from line 6—6 in FIG. 4;

FIG. 7 is an enlarged partial sectional view taken along line 7—7 in FIG. 6;

FIG. 8 is a sectional view of the unit taken along line 8—8 in FIG. 6;

FIG. 9 is an enlarged fragmentary elevational view showing a portion of a power gear shift control means incorporating features of the present invention;

FIG. 10 is a bottom view of the structure shown in FIG. 9;

FIG. 13 is an enlarged elevational view showing control switch means included in the unit shown in FIG. 11;

FIG. 14 is a sectional view taken along line 14—14 in FIG. 13;

FIG. 15 is a sectional view taken along line 15—15 in FIG. 13;

FIG. 16 is a elevational view of the structure shown in FIG. 13 and seen along line 16—16;

FIG. 17 is a sectional view taken along line 17—17 in FIG. 13;

FIG. 18 is a sectional view taken along line 18—18 in FIG. 13;

FIG. 19 is a partial sectional view showing a power actuator unit for shifting gears and adapted to be actuated in response to push-button control means;

FIG. 20 is a partial sectional unit showing push-button control or switch means for actuating the unit shown in FIG. 19; and FIG. 21 is an elevational view showning an electrical cable for connecting the push-button unit shown in FIG. 20 with the power actuator unit shown in FIG. 19.

Figure 11:
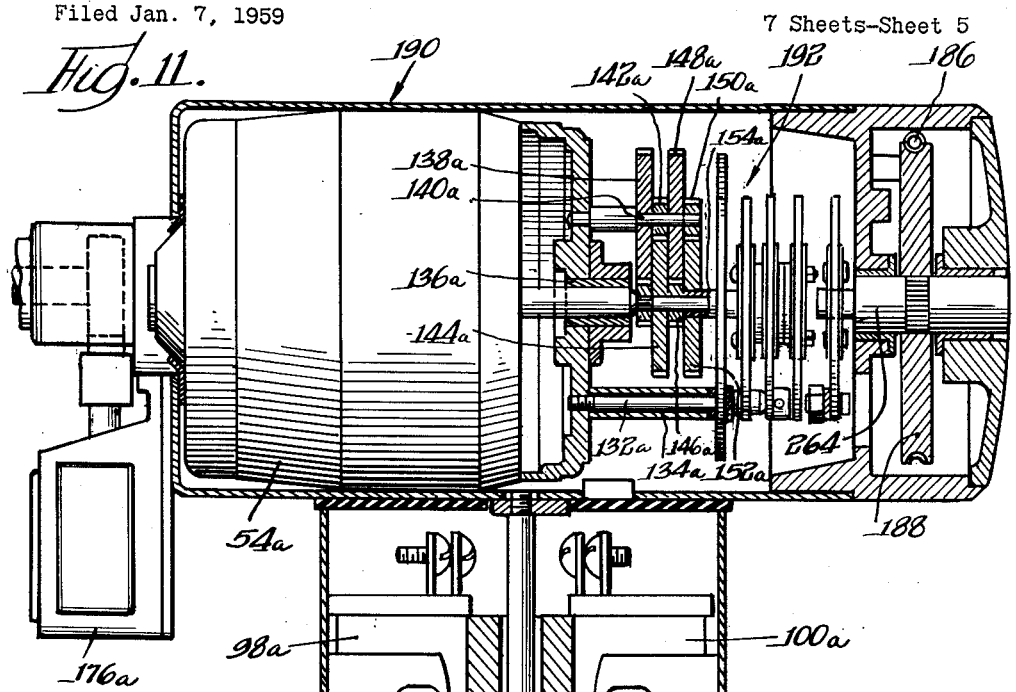
FIG. 11 is a partial longitudinal sectional view of the power actuator unit included in the structures of FIGS. 9 and 10.

Referring now more specifically to the drawings, wherein like parts are designated by the same numerals throughout the various figures, a boat 20 is shown in FIG. 1, which boat is provided with an outboard motor 22 adapted to be turned for steering purposes by means of a steering control system 24 incorporating features of the present invention. In order to facilitate the present disclosure, an inboard engine 26 is shown in broken lines in the boat 20 and a gear shift control system 28 incorporating features of the present invention is associated with the inboard engine. It is to be understood, however, that the boat would not normally be provided with both the inboard and outboard motors. Furthermore, the gear shift control system of the present invention could be adapted for use in connection with the outboard motor and the steering control system of the present invention could be adapted for controling the rudder of an inboard motor boat or the like.

As shown in FIGS. 1 through 8, the steering control system 24 comprises a steering wheel 30 fixed on a steering shaft 32 mounted at any suitable location in the boat such as on a dashboard 34. A power actuator unit 36 is, as shown best in FIGS. 4 and 5, pivotally connected by pin 38 to a support bracket 40 which is mounted on the transom 42 of the boat adjacent the motor 22. Means is provided for transmitting a signal caused by movement of the steering wheel 30 to the power unit 36 for actuating the power unit in response to the signal. This means comprises a tooth wheel 44 fixed to the steering shaft 32 as shown in FIG. 3 and as shown schematically in FIG. 2. A flexible cable 46 is associated with the wheel or gear 44 and is provided with axially spaced protuberances or teeth meshing with the teeth of the gear 44 so that rotation of the gear 44 causes longitudinal movement of the cable 46. The protuberances or teeth may be provided on the cable or motion transmitting element 46 by providing a helically wound wire with axially spaced coils on the cable in a known manner. The cable 46 extends through a suitable flexible guide conduit 48 to the power unit 36 and meshes with another complementary tooth wheel or gear 50 which is shown in FIG. 7 and which provides a part of the power unit 36.

The power unit 36 is provided with an exterior cylindrical housing 52 and, in the embodiment disclosed, a shunt wound split field direct current electric motor 54 is mounted in the housing 52 adjacent one end thereof. One end of the motor armature shaft 56 projects from the housing 52 and is connected by a suitable coupling 58 shown in FIGS. 6 and 8 to a drive shaft 60 which carries a worm 62 and is rotatably supported in housing 64 mounted by brackets 66. A worm gear 68 is also rotatably mounted in the gear housing 64 and meshes with and is driven by the worm 62. The worm gear is fixed on and drives a screw shaft 70 which projects laterally from the gear housing 64 and is rotatably supported thereby in a manner which prevents axial displacement of the screw shaft 70 relative to the gear housing.

The power unit 36 is actuated and controlled in the manner described in detail below so that when it is desired to turn the boat, the motor armature 56 is driven in an appropriate direction. This, of course, causes the screw shaft 70 to be driven. In order to manipulate or turn the outboard motor 22 in response to rotation of the screw shaft 70, the power unit 36 is mounted and connected with the motor in the manner shown best in FIGS. 4 and 5. More specifically, the pivot pin 38 mentioned above extends through suitable apertured boss means 72 secured to or made integral with a portion of the gear housing 64 for pivotally connecting the power unit with the fixed bracket 40. A lever 74 has one end pivotally connected by pin means 76 to the bracket 40 at a point substantially spaced from the pivot pin 38. An elongated radially extending slot 78 is provided in an opposite end portion of the lever 74 for accommodating pivot means 80 which serves to connect linkage means 82 with the lever. The linkage means 82 is connected with the motor 22 and is of suitable construction so that when the lever 74 is shifted between the full and broken line positions shown in FIG. 5, the motor 22 will be turned. In order to actuate the lever 74, a nut 84 is threaded onto the screw rod 70. The nut is provided with laterally projecting boss means 86 which is connected with the lever 74 by a pivot pin 88 located between the pivots 76 and 80. It will be appreciated that the connection between the nut and the lever 74 will prevent rotation of the nut about the screw rod 70 so that when the screw rod is turned, the nut member will be advanced or retracted along the rod. This, of course, will cause pivotal movement of the lever 74 and turning movement of the motor 22. In order to protect the screw rod and related elements against damage from moisture and the like, the outer end of the rod is covered by a sleeve 90 which is fixed to and moves with the nut member 84, and an inner end portion of the rod is covered by a flexible corrugated tube 92 having one end secured to the gear housing 64 and an opposite end secured and sealed to the nut member 84.

The means for controlling operation of the motor 54 in response to signals provided by or movement of the gear 50 and thus the steering wheel 30 is shown in FIGS. 2, 6 and 7. More specifically, the motor 54 shown schematically in FIG. 2 for the purpose of illustrating the present invention comprises first and second field coils 94 and 96 connected to a pair of single pole, double throw, one pair of contacts normally closed relays 98 and 100. One lead of each relay is connected with one lead of a battery or other suitable power source which has its other lead connected with a suitable ground 104. Another lead of the coil of the relay 98 is connected with a circuit element 106 on a dead band type limit switch disc 108. The coil of the relay 100 is similarly connected with another circuit element 110 located on the disc 108 and insulated from the element 106. The elements 106 and 110 may conveniently be printed on the disc 108. A rotatably supported electrical contact 112 is associated with the disc 108 and is connected with the common ground 104. The contact 112 is oppositely connected with the gear wheel 50 in the manner described in detail below so that when the gear wheel is rotated the contact 112 will be selectively moved into engagement with either the circuit element 106 or the circuit element 110. If, for example, the movable contact 112 is pivoted into engagement with the circuit element 110, the relay 100 will be energized so as to shift the movable contact 116 thereof out of engagement with the contact 118 connected with the field coil 96 and into engagement with the contact 120 connected with the power source or battery 102 whereby to energize the field coil 94 and cause rotation of the armature shaft 56 in one direction. When, on the other hand, the contact 112 is moved into engagement with the circuit element 106, the relay 98 is energized so that its intermediate or movable contact 122 is shifted from the field contact 124 and into engagement with a stationary contact 126 connected with the power source so as to energize the field coil 96 and cause rotation of the motor armature shaft 56 in an opposite direction. It is to be noted that the disc 108 is rotatably mounted and operatively connected, in the manner described below, with the armature shaft 56 so that the disc 108 is rotated in response to rotation of the armature shaft. Thus the motor 54 will be energized and the armature shaft 56 will continue to rotate after the electrical contact 112 has been moved into engagement with either the element 106 or the element 110 until the disc 108 has been rotated sufficiently to disengage the electrical element from the contact 112.

Referring particularly to FIGS. 6 and 7, it is seen that the disc 108 is fixed to a suitable insulation and bearing assembly 128 which is rotatably supported within an apertured bracket or plate member 130. The plate member 130 is in turn mounted to an end of the motor 54 by suitable screws 132 and spacers 134. An end of the armature shaft 56 extends from the motor 54 in axial alignment with and at least partially into the bearing and insulating assembly 128. In order to provide a driving connection between the armature shaft and the disc 108 and also to reduce the rate of rotation of the disc relative to the rate of rotation of the armature, reduction gearing is provided. More specifically, a small pinion 136 is fixed on the shaft 56 and meshes with a gear 138 which is rotatably supported on a shaft 140 laterally offset from and parallel to the armature shaft, as shown best in FIG. 6. Another pinion 142 is formed integral with or connected to the rear 138 and this pinion meshes with another gear 144 on and freely rotatable relative to the armature shaft 56. Still another pinion 146 is formed integrally with or secured to the gear 144 and this pinion meshes with and drives a gear 148 which is freely rotatable on the shaft 140 and which is also freely rotatable relative to the gear 138 and the pinion 142. The gear 148 also is formed integrally with or connected to a pinion 150 which meshes with an drives a gear 152 keyed or otherwise fixed to a hollow shaft 154. The hollow shaft 154 is disposed on and freely rotatable relative to the armature shaft 56, and in addition to the hollow shaft 154 extends into and is keyed or otherwise fixed to the bearing and insulating assembly 128 so as to drive the disc 108.

As shown in FIG. 7, reduction gearing means is also provided for driving or rotating the electrical contact 112 in response to rotation of the gear wheel 50. More specifically, the gear wheel 50 is fixed on and drives a shaft 156 which is journalled in a housing member 158 supplementing and connected with the cylindrical housing 52. An end member 160 is connected to and closes an end of the supplemental housing member 158 and also aids in rotatably supporting the shaft 156. The shaft 156 includes a reduced diameter inner end portion 162 which carries and is drivingly connected to a pinion 164. The pinion 164 meshes with a gear 166 rotatably supported on a shaft 168. A pinion 170 is formed integrally with or connected to the gear 166 and this pinion meshes with a gear 172 supported by and freely rotatable relative to the reduced diameter shaft portion 162. The contact element 112 is fixed by rivets 174 to and is movable with the gear 172.

In order to prevent overdriving of the screw rod 70 as a result of inertia built up in the armature of the motor 54, spring biased solenoid actuated brake means 176 is provided for restraining the armature shaft against rotation whenever the electric motor 54 is deenergized. As shown generally in FIGS. 6 and 8, the brake means 176 includes a brake shoe 178 carried by a reciprocable plunger 180 which is normally spring biased so that the shoe 178 frictionally engages the coupling 58 and thus the armature shaft. The brake means is provided with a solenoid coil 182 which, as shown in the schematic drawing in FIG. 2, is connected in the electric circuit so as to be energized to retract the brake shoe only when one of the motor field coils is energized. The brake means 176 also aids the self-locking characteristics of the worm 62 and worm wheel 68 in preventing rotation of the shaft 70 in response to any forces applied to the shaft or screw rod 70 through the linkage system connected with the motor 22. In other words, the motor 22 is effectively locked against any turning movement except when the electric motor 54 is energized in response to movement of the steering wheel 30.

Referring now particularly to FIGS. 1 and 9 through 18, the gear shift control system 28 will be described. In this embodiment, a hand operated lever 194 is provided for actuating a gear corresponding to the above described gear 44 associated with the steering wheel and thereby actuating a motion transmitting element or toothed cable 186 which in turn meshes with and actuates a gear 188 providing a part of a power unit 190. Except for limit switch means 192 the structure of power unit 190 is essentially the same as the structure of the unit 36 described above and therefore elements of the unit 190 which correspond to elements of the above described unit 36 are identified by identical reference numerals with the suffix "a" added. Thus, a detailed description of these corresponding elements can be omitted.

The power unit 190 may be mounted by various suitable means so that it is adapted to actuate a gear shift operating shaft 196 of the engine 26. In the embodiment shown best in FIGS. 9 and 10 for the purpose of illustrating the present invention, a unit 190 is pivotally connected by pin means 38a between a pair of bracket members 198 and 200. One end of each of the bracket members 198 and 200 is fixed and supported by a suitable rod or hanger 202 which in turn is mounted to a fixed support by a bracket 204. A lever 206 is fixed to the gear shift shaft 196 and the sleeve 90a which surrounds the outer end portion of the screw rod of the power unit 190 is pivotally connected to the lever 206 by pin means 208 which extends through an elongated slot 210 provided in the lever. Thus, as the sleeve 90a is advanced or retracted upon rotation of the screw rod, the lever 206 will be pivoted so as to shift the gears of the engine.

Figure 12:
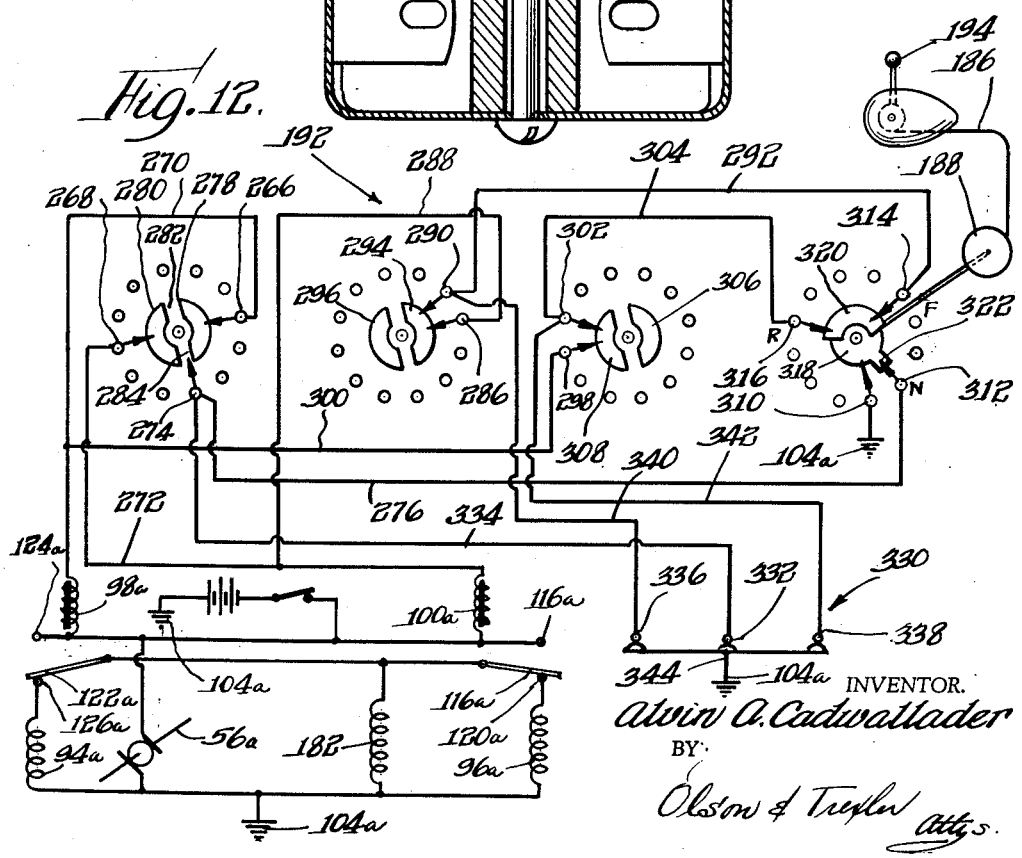
FIG. 12 is a schematic view showing the control circuit for the gear shift control means.

The control switch means 192 of the power unit 190 is shown in detail in FIGS. 11 and 13–18 and the switch means is shown schematically in FIG. 12. As shown in the drawings, the control switch means 192 comprises a face or supporting plate 212 secured to the motor 54a by means of the screws 132a and spacers 134a. U-shaped brackets 214 and 216 are secured to the mounting plate 212 for supporting a plurality of stationary electrical contact carrying discs 218, 220, 222 and 224, which discs are formed from suitable insulating material. The first or bottom disc 218 is secured in position against the innermost legs of the U-shaped brackets by means of screws 226 and 228 and suitable spacers as shown best in FIGS. 13 and 15. The disc 220 is spaced from the disc 18 by the heads of the screws 226 and 228, and an internally threaded block 230 is pivotally connected with a peripheral portion of the disc 220 by integral pin means 232 and threadedly receives a screw 234 which extends through the closed end of the bracket 216. This structure enables the disc 220 to be rotatively adjusted relative to the fixed disc 218. The disc 222 is similarly rotatively adjustably supported and is pivotally connected with an internally threaded block 236 which receives a screw 238 extending through the closed end of the bracket 214 as shown in FIFGS. 13, 14 and 18. It will be appreciated that suitable nut elements or collars 240 are provided on the screws 234 and 238 in the manner shown in FIG. 16 so as to prevent axial displacement of these screws relative to their associated brackets. The disc 224 is fixed to the outer arms of the brackets 214 and 216 by suitable nut and bolt means 242 and 244.

Associated with the various contact supporting discs mentioned in the preceding paragraph are contact carrying rotor elements 246, 248, 250 and 252 which combine with the discs and contact elements described below to provide switch sub-assemblies 254, 256, 258 and 260 respectively shown best in FIGS. 15, 17, 18 and 14. The rotor elements 246, 248 and 250 are connected together by screws or the like 262 to provide a rotor assembly mounted on and driven by the shaft 154a as shown best in FIG. 13. The rotor element 252 of the switch sub-assembly 260, however, is fixed on and rotatable with a rotatably supported shaft 264 which also carries and is driven by the gear 188 as shown best in FIG. 11.

The switch sub-assembly 260 is a command switch which, upon being adjusted manually in response to movement of the lever 194, conditions the electric circuit of the power unit so as selectively to cause the gear shift mechanism of the engine to be moved to and from forward, reverse, and neutral positions. The switch sub-assembly 254 controls operation of the power unit to the neutral position from either the forward or reverse positions, the switch sub-assembly 256 controls movement of the power unit to the forward position and the sub-assembly 258 controls movement of the power unit to the reverse position.

As shown in FIGS. 12 and 15, the switch sub-assembly 254 includes fixed electrical contacts 266 and 268 respectively connected by wires 270 and 272 to the relay coils 98a and 100a. The arrangement of the control system is such that when the relay coil 98a is energized the motor 54a will function to move the gear shift mechanism toward the reverse position and when the relay coil 100a is energized the gear shift mechanism will be moved toward the forward position. The switch sub-assembly 254 also includes another stationary contact 274 fixed on the disc 218 and connectable with the common electrical ground 104a by a wire 276 and the command switch sub-assembly 260 in the manner described below. The rotor element of the switch sub-assembly 254 carries a pair of arcuate electrical contact elements 278 and 280 which are electrically insulated from each other and which are constructed and arranged so that spaces 282 and 284 are provided between opposite ends thereof of sufficient width to accommodate the stationary contact elements selectively to disengage the stationary contact elements from the rotary elements in the manner described below. For example, a rotor element of the switch sub-assembly 254 is shown in the neutral position in FIG. 15 and in this position the stationary contact 274 is disengaged from both of the rotary contact elements 278 and 280.

The switch sub-assembly 256 is provided with a stationary contact 286 which is connected by wire 288 with the forward relay coil 100a. Another stationary contact 290 on the disc 220 is connectable with the common ground 104a by a wire 292 and the command switch sub-assembly 260 in the manner described below. The rotor of the switch sub-assembly 256 carries a pair of arcuate electrical contact elements 294 and 296 which are electrically insulated from and spaced from each other in substantially the same manner as the elements 278 and 280 described above. The rotor of the switch subassembly 256 is also shown in the neutral position in FIG. 17 and it is to be noted that in this position the contacts 286 and 290 are electrically connected with each other through the movable contact 294. Thus with the rotor in this position, the forward relay coil 100a will be energized upon manipulation of the control switch sub-assembly 260 to ground the contact 286.

The switch sub-assembly 258 is provided with a first fixed contact 298 connected with the reverse relay coil 98a by a wire 300, and a second fixed contact 302 on the disc 222 and connectable with the common ground through a wire 304 and the command switch sub-assembly 260. The rotor member 250 of the switch sub-assembly 258 carries arcuate electrical contact elements 306 and 308 which are electrically insulated and spaced from each other in essentially the same manner as the similar rotary contact elements discussed above. As shown in FIG. 18, the rotor of the switch sub-assembly 258 is also in the neutral position and it will be noted that, in this position, the contacts 298 and 302 are electrically connected with each other through the movable contact 308. Thus, upon manipulation of the command switch sub-assembly in the manner described below to ground the contact 302, the reverse relay coil 98a will be energized.

The command switch sub-assembly 260 is provided with a first fixed contact 310 on the disc 224, which contact is connected with the common ground 104a. Additional fixed contacts 312, 314 and 316 are spaced around the disc 224, which contacts are respectively connected with the wires 276, 292 and 304. The rotor element of the switch sub-assembly 260 carries a circular electrical contact 318. It will be noted that the fixed contacts 310, 314 and 316 are equally spaced around the rotary circular contact 318, and a member 320 of electrical insulating material overlies a segment of the circular contact element 318. The extent and location of the insulating member 320 is such that when the rotary switch element 318 is in the neutral position shown in FIG. 14, it is insulated from both of the contacts 314 and 316. It is to be noted that the stationary contact 312 is disposed so that its innermost end is spaced radially outwardly from a circle defined by the inner ends of the contacts 310, 314 and 316 and also radially outwardly of the main circular body of the contact element 318. However, contact element 318 is provided with a radially projecting tab 322 adapted to engage and provide an electrical connection with the contact element 312 when the rotary contact element 318 is in the neutral position shown in FIG. 14. It will be noted that the circumferential extent of the tab 322 is limited so that upon rotation of the contact element 318 a predetermined amount in either direction, the tab 322 will disengage from the contact 312 and the contact 312 will thus become electrically disconnected from the rotary contact 318. As shown best in FIG. 14, the arrangement is such that when the rotary contact element 318 has been rotated in a forward or counterclockwise direction sufficiently to disengage the tab 322 from the contact 312, the insulating member 320 will have moved from beneath the contact element 314 so that the contact element 314 will be electrically connected with the ground contact 310 through the rotary element 318. Similarly, when the rotary element 318 has been removed in the reverse or clockwise direction a distance sufficient to disengage the tab 322 from the contact 312, the contact 316 will be electrically connected with the ground contact 310.

While the operation of the gear shift control system is believed to be clear from the above description, a brief résumé of such operation is as follows. Starting with all of the elements in the neutral position, as shown in FIGS. 12, 14, 15, 17 and 18, it will be observed that the motor 54a is deenergized since neither of the relay solenoids 94a and 96a is energized. Upon movement of the control lever 194 in the forward direction, the rotary contact element 318 is turned in a counterclockwise direction as viewed in FIG. 14 to disconnect the contact 312 from the ground contact 310. When this occurs the circuit including the forward relay coil 100a and the forward switch sub-assembly 256 is completed so that the motor 54a is energized to rotate in a direction which causes the gear shift mechanism to be shifted to the forward position. During rotation of the motor 54a, the rotor elements of the switch sub-assemblies 254, 256 and 258 are driven in unison by the feedback or reduction gearing means which drives the shaft 154a from the motor armature shaft. The arrangement is such that these rotor elements are driven in unison in the forward or clockwise direction as viewed in FIGS. 15, 17 and 18 until such time as the arcuate rotary contact element 294 of the switch sub-assembly 256 passes the stationary contact element 290 sufficiently to interrupt the connection between the contacts 286 and 290. When this occurs the forward relay coil 100a and the motor 54a are deenergized. It will be noted that the rotor element of the switch sub-assembly 54a will be positioned so that the contacts 274 and 266 are electrically connected with each other when the rotor has stopped in the forward position. Thus, when the lever 194 is returned from the forward position to the neutral position so that the contact 312 is connected with the ground contact 310, the reverse relay coil 98a will be energized to reverse the motor 54a until such time as the rotor element of the switch sub-assembly 254 has been returned to the position shown in FIG. 15 whereupon the circuit is opened and the motor is deenergized. It will be appreciated that the apparatus functions in substantially the same manner heretofore described in order to actuate the gear shift mechanism to and from the reverse position except, of course, that the lever 194 is moved to the reverse position so as to actuate the command switch sub-assembly 260 in a manner which completes the circuit including the switch sub-assembly 258 and the reverse relay coil 98a.

FIGS. 19 through 21 disclose a modified embodiment of the gear shift control system described above. This embodiment is identical to the gear shift control system described above except that the command switch sub-assembly 260 and the mechanical means for manipulating the same have been eliminated and replaced by a pushbutton control unit shown in FIG. 20 and generally designated by the numeral 330. Therefore elements of the structure of this embodiment corresponding to elements discussed above are identified by identical reference numerals with the suffix "b" added and need not be described in detail. Furthermore, in order to expedite the present disclosure, the pushbutton control unit 330 is schematically shown in the circuit diagram of FIG. 12. It is to be noted that while the structure shown in FIGS. 19–21 contemplates the elimination of the command switch sub-assembly 260 and the mechanical control means therefore, it would be permissible to retain these elements in the system and use the pushbutton unit as an alternative control device.

The pushbutton control unit 330 may be easily located at any convenient position in the boat. The unit includes a pushbutton or other suitable switch 332 connected by wire means 334 with the ground contact of the neutral controlling switch sub-assembly. The unit 330 also includes pushbutton switches 336 and 338, respectively, connected by wire means 340 and 342 with the ground contacts of the forward and reverse controlling switch sub-assemblies. Contacts of the switches 332, 336 and 338 are also connected with the common ground by wire means 344. In the embodiment disclosed in FIGS. 19-21, the various wire means 334, 340, 342 and 344 includes a cable 346 having suitable pronged plug means 348 and 350 at its opposite ends adapted to be inserted into suitable sockets 352 and 354, respectively, incorporated into the pushbutton control unit 330 and the power actuator unit 190b. Such a cable facilities easy and economical installation of the control system in the boat.

While the preferred embodiments of the present invention have been shown and described herein, it is obvious that many structural details may be changed without departing from the spirit and scope of the appended claims.

The invention is claimed as follows:

1. A marine power control system of the type having an operator control station remotely located relative to a mechanism to be controlled and which comprises, bracket means fixedly mounted proximate said mechanism, a power unit, a connection for pivotally mounting said power unit on said bracket means, a lever pivotally supported at one end to said bracket means at a point remotely spaced from said pivotal connection, means for operatively connecting said lever to said mechanism, a screw shaft adapted to be rotated by said power unit, a nut member coacting to be driven axially of said screw shaft, means for connecting said nut member to said lever whereby actuation of said power unit will move said lever, switch means for energizing said power unit, lever means disposed proximate the operator control station, and means for interconnecting said lever means and said switch means for remotely controlling said mechanism.

2. A marine power control system as set forth in claim 1 in which said lever means is movable to a plurality of positions to begin actuation of said power unit and means for automatically interrupting actuation of said power unit after one of said positions has been selected and a predetermined movement of said mechanism has taken place.

3. A marine power control system as set forth in claim 1 in which said power unit comprises a housing, a reversible electric motor mounted within said housing and having a rotor shaft extending longitudinally of said housing, one end portion of said shaft extending from one end portion of said housing, electrically controllable brake means mounted between said one end portion of said housing and said one end portion of said rotor shaft for releasably holding said shaft against rotation, circuit means for controlling said brake means and said motor, said circuit means including said switch means which is mounted within a second end portion of said housing opposite from said first housing end portion and adapted to be manually conditioned for releasing said brake means and for selectively operating said motor in opposite directions, said switch means including rotatable means substantially axially aligned with said rotor shaft and driven from and in timed relationship with said rotor shaft for stopping said motor after completion by the motor of a predetermined movement in either of said opposite directions.

4. A marine power control system as set forth in claim 1 in which said interconnecting means comprises a first rotatable member adapted to be connected to said lever means, a second rotatable member disposed adjacent and drivingly interconnected with said switch means, and an elongated motion transmitting element extending between said rotatable members.

5. A marine power control system as set forth in claim 1 in which said power unit comprises a reversible rotary motor including an armature shaft having one end connectable with said screw shaft, circuit means including said switch means for controlling operation of said motor selectively in opposite directions, said lever means being adapted to condition said circuit means selectively for operating said motor in opposite directions, said switch means including rotary switch element axially aligned with said armature shaft for stopping said motor upon the completion thereof of a predetermined movement, and gearing means connected with said armature shaft and with said rotary switch element for driving the rotary switch element in timed relationship with said motor for stopping the motor after the completion by the motor of a predetermined movement in either of said opposite directions, said gearing means comprising a first gear element fixed on said shaft, a second gear element driven by said first gear element and rotatable about an axis parallel to and laterally offset from said shaft, and at least another gear element supported by and freely rotatable relative to said shaft and providing a driving connection between said second gear element and said rotary switch means.

References Cited in the file of this patent

UNITED STATES PATENTS

| | | |
|---|---|---|
| 1,695,615 | Sperry | Dec. 18, 1928 |
| 1,946,693 | Hodgman | Feb. 13, 1934 |
| 2,185,074 | Chance | Dec. 26, 1939 |
| 2,385,459 | Nelson et al. | Sept. 25, 1945 |
| 2,446,393 | Russell | Aug. 3, 1948 |
| 2,498,223 | Rommel | Feb. 21, 1950 |
| 2,810,205 | Hodgman | Nov. 14, 1957 |